（12) United States Patent
Kim et al.

(10) Patent No.: US 11,458,971 B2
(45) Date of Patent: Oct. 4, 2022

(54) APPARATUS FOR CONTROLLING PLATOONING AND METHOD THEREOF

(71) Applicants: HYUNDAI MOTOR COMPANY, Seoul (KR); KIA MOTORS CORPORATION, Seoul (KR)

(72) Inventors: Seung Hyun Kim, Seoul (KR); Hong Gi Park, Seoul (KR); Sang Yeob Lee, Seongnam-si (KR); Il Hwan Kim, Hwaseong-si (KR); Dong Hyuk Kim, Hwaseong-si (KR); Kyung Joo Bang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 289 days.

(21) Appl. No.: 16/847,250

(22) Filed: Apr. 13, 2020

(65) Prior Publication Data
US 2021/0163003 A1 Jun. 3, 2021

(30) Foreign Application Priority Data

Dec. 3, 2019 (KR) .......................... 10-2019-0159277

(51) Int. Cl.
G08G 1/00 (2006.01)
B60W 40/105 (2012.01)
G05D 1/02 (2020.01)
B60W 30/14 (2006.01)
B60W 30/165 (2020.01)
B60W 50/14 (2020.01)

(52) U.S. Cl.
CPC ........ *B60W 30/165* (2013.01); *B60W 30/143* (2013.01); *B60W 40/105* (2013.01); *B60W 50/14* (2013.01); *G05D 1/0287* (2013.01); *G08G 1/22* (2013.01)

(58) Field of Classification Search
CPC .... G08G 1/22; B60W 30/143; B60W 40/105; B60W 50/14
See application file for complete search history.

(56) References Cited

U.S. PATENT DOCUMENTS

| 2016/0339929 | A1* | 11/2016 | Schoenly | ............ | B61L 15/0018 |
| 2017/0334461 | A1* | 11/2017 | Schoenly | ................ | B61C 17/12 |
| 2018/0201264 | A1* | 7/2018 | Schoenly | .............. | B61L 25/025 |
| 2019/0179339 | A1 | 6/2019 | Kim | | |
| 2020/0139945 | A1* | 5/2020 | Schoenly | .............. | B60T 8/1705 |
| 2021/0041893 | A1* | 2/2021 | Matsumoto | .............. | G08G 1/22 |

FOREIGN PATENT DOCUMENTS

KR 20190068931 A 6/2019

* cited by examiner

Primary Examiner — Alan D Hutchinson
Assistant Examiner — Andy Schneider
(74) Attorney, Agent, or Firm — Lempia Summerfield Katz LLC

(57) ABSTRACT

An apparatus for controlling platooning and a method thereof are provided. The apparatus includes a communication part to transmit or receive information on the platooning and information on a restricted area from or to vehicles in a platooning line and a vehicle external server. The apparatus further includes a processor to restrict an inter-vehicle distance from being increased or an acceleration when a leading vehicle in the platooning line enters the restricted area based on the information on the restricted area.

20 Claims, 7 Drawing Sheets

APPARATUS FOR CONTROLLING PLATOONING AND METHOD THEREOF

CROSS-REFERENCE TO RELATED APPLICATION

This application claims the benefit of priority to Korean Patent Application No. 10-2019-0159277, filed in the Korean Intellectual Property Office on Dec. 3, 2019, the entire contents of which are incorporated herein by reference.

TECHNICAL FIELD

The present disclosure relates to an apparatus for controlling platooning and a method thereof, and more particularly to a technology of maintaining a platooning line when vehicles in the platooning line travels in a restricted area.

BACKGROUND

Platooning is a technology that a plurality of vehicles perform autonomous driving when the vehicles are aligned with each other in line while being spaced apart from each other by a specified distance. During platooning, a leading vehicle (LV), which is positioned at the frontmost position of a platooning line, may control at least one following vehicle (FV), which follows the leading vehicle. The leading vehicle may maintain the distance between the plurality of vehicles included in the platooning line. The leading vehicle may exchange the behaviors of the plurality of vehicles included in the platooning line and situation information through inter-vehicle communication. The distance between the vehicles included in the platoon line may be adjusted during traveling depending on the intention of the driver.

Conventionally, when the platooning line passes through a road having a specific speed limit or a restricted area having a speed bump, although a leading vehicle passes through the restricted area, a following vehicle has not yet passed through the restricted area. In this state, the leading vehicle may accelerate to a preset speed without taking into consideration the following vehicle. In this case, since the following vehicles are still in the restricted area, the vehicles in the platooning line frequently fail to perform platooning instead of maintaining the initial distance therebetween. Thus, the fuel efficiency of the platooning is reduced.

SUMMARY

The present disclosure has been made to solve the above-mentioned problems occurring in the prior art while advantages achieved by the prior art are maintained intact.

An aspect of the present disclosure provides an apparatus for controlling platooning. The apparatus is capable of controlling the platooning such that vehicles in a platooning line share information on a restricted area together based on V2X and V2V communications to maintain a platooning line when passing through the restricted area. The present disclosure further provides a method thereof.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, an apparatus for controlling platooning, may include a communication part to transmit or receive information on the platooning and information on a restricted area from or to vehicles in a platooning line and a vehicle external server. The apparatus may further include a processor to restrict an inter-vehicle distance from being increased or acceleration when a leading vehicle in the platooning line enters the restricted area based on the information on the restricted area.

According to an embodiment, the method may further include a display controlled by the processor to display the information on the platooning and the information on the restricted area.

According to an embodiment, the processor may calculate a reference distance using a speed of the leading vehicle and a preset margin time. The processor may determine whether a remaining distance until the leading vehicle reaches the restricted area is shorter than the reference distance.

According to an embodiment, the processor may increase an inter-vehicle distance to a preceding vehicle when the remaining distance until the leading vehicle reaches the restricted area is shorter than the reference distance and when a host vehicle is a following vehicle.

According to an embodiment, the processor may perform a control operation to display the information on the restricted area of the leading vehicle on the display.

According to an embodiment, the processor may control a speed of the platooning line to a preset speed when a remaining distance until the leading vehicle reaches the restricted area is equal to or longer than the reference distance.

According to an embodiment, the processor may determine whether the leading vehicle is expected to enter the restricted area based on information on a map received from the vehicle external server.

According to an embodiment, the processor may determine whether a last vehicle in the platooning line passes through the restricted area.

According to an embodiment, the processor may control a speed of the platooning line to a preset speed when the last vehicle in the platooning line passes through the restricted area.

According to an embodiment, the processor may restrict the vehicles in the platooning line from accelerating when a preset margin time has not elapsed after the last vehicle in the platooning line passes through the restricted area.

According to an embodiment, the processor may perform a control operation to display the information on the restricted area of following vehicles on a display of the leading vehicle.

According to an embodiment, the restricted area may include at least one of a road having a speed limit, a speed bump, an uphill road, and/or a crossroad.

According to an embodiment, the processor may calculate a passable time based on a whole length of the platooning line, a width of a crossroad, and a speed of the platooning line when the leading vehicle is expected to enter the crossroad.

According to an embodiment, the processor may determine whether a time remaining until a traffic light on the crossroad is changed exceeds the passable time.

According to an embodiment, the processor may control the platooning line to travel at a preset speed when the time remaining until the traffic light on the crossroad is changed exceeds the passable time.

According to an embodiment, the processor may control the vehicles in the platooning line to stop before entering the crossroad when the time remaining until the traffic light on the crossroad is changed is equal to or smaller than the passable time.

According to an embodiment, the processor may increase an inter-vehicle distance to a preceding vehicle when the remaining time until the traffic light on the crossroad is changed is equal to or smaller than the passable time and when a host vehicle is a following vehicle.

According to another aspect of the present disclosure, an apparatus for controlling platooning may include a processor to restrict an inter-vehicle distance between vehicles in a platooning line from being increased or acceleration of the vehicles when a leading vehicle in the platooning line enters a restricted area. The apparatus may further include a display to display information of an entrance to the restricted area.

According to another aspect of the present disclosure, a method for controlling platooning may include transmitting or receiving information on the platooning and information on a restricted area from or to vehicles in a platooning line and a vehicle external server. The method may further include restricting an inter-vehicle distance between the vehicles in the platooning line from being increased or acceleration of the vehicles when a leading vehicle in the platooning line enters the restricted area.

According to an embodiment, the restricting of the inter-vehicle distance between the vehicles in the platooning line from being increased or the acceleration of the vehicles may include calculating a reference distance using a speed of the leading vehicle and a preset margin time. The restricting of the inter-vehicle distance may further include determining whether a remaining distance until the leading vehicle reaches the restricted area is shorter than the reference distance. The restricting of the inter-vehicle distance may further include increasing an inter-vehicle distance to a preceding vehicle when the remaining distance until the leading vehicle reaches the restricted area is shorter than the reference distance and when a host vehicle is a following vehicle. The restricting of the inter-vehicle distance may further include controlling a speed of the platooning line to a preset speed when a remaining distance until the leading vehicle reaches the restricted area is equal to or longer than the reference distance.

According to an embodiment, the restricting of the inter-vehicle distance between the vehicles in the platooning line from being increased or the acceleration of the vehicles may include determining whether a last vehicle in the platooning line passes through the restricted area. The restricting of the inter-vehicle distance may further include controlling a speed of the platooning line to a preset speed when the last vehicle in the platooning line passes through the restricted area. The restricting of the inter-vehicle distance may further include restricting the vehicles in the platooning line from accelerating when a preset margin time has not elapsed after the last vehicle in the platooning line passes through the restricted area.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
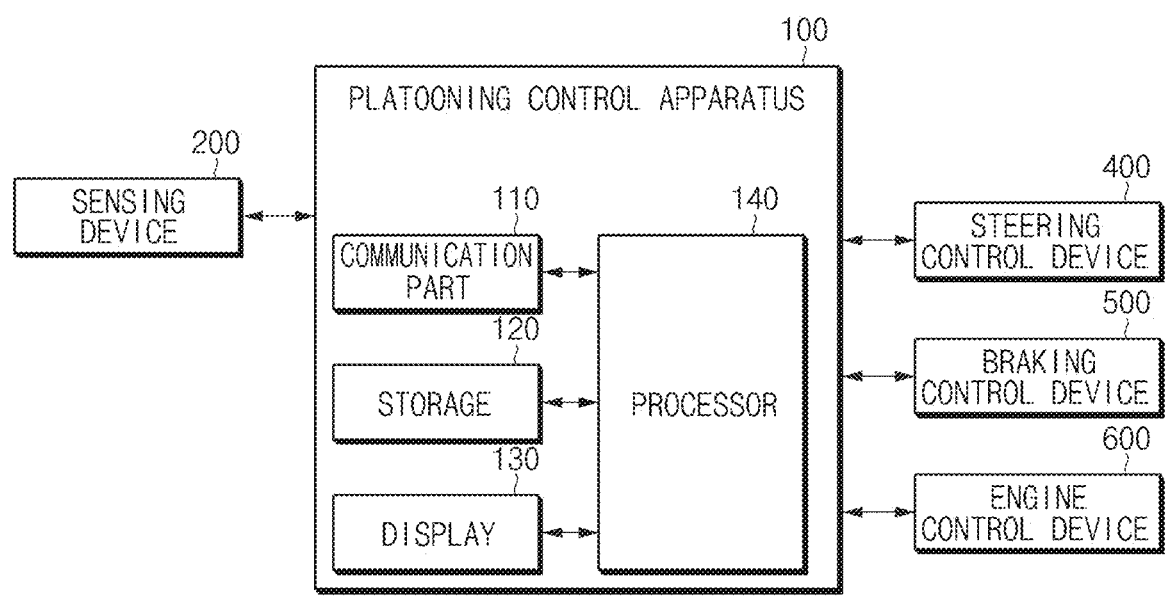
FIG. 1 is a block diagram illustrating the configuration of a vehicle system including an apparatus for controlling platooning according to an embodiment of the present disclosure.

Hereinafter, some embodiments of the present disclosure are described in detail with reference to the drawings. In adding the reference numerals to the components of each drawing, it should be noted that an identical or equivalent component is designated by an identical numeral even when they are displayed on other drawings. Further, in describing an embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component. Such terms do not limit the nature, sequence or order of the constituent components. In addition, unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art. Such terms are not to be interpreted as having ideal or excessively formal meanings unless clearly defined in the present application.

Hereinafter, embodiments of the present disclosure are described with reference to FIGS. 1 to 7.

A leading vehicle (LV) and a following vehicle (FV) included in a platoon may perform platooning on a road. The LV and the FV may travel while maintaining a specific distance therebetween. The LV and the FV may adjust, during travelling, the distance therebetween and the speeds thereof based on sensor information and platooning information shared between the LV and the FV through V2V communication.

FIG. 1 is a block diagram illustrating the configuration of a vehicle system including an apparatus (platooning control apparatus) for controlling platooning according to an embodiment of the present disclosure.

Referring to FIG. 1, according to an embodiment of the present disclosure, the vehicle system may include a platooning control apparatus 100, a sensing device 200, a steering control device 400, a braking control device 500, and an engine control device 600.

According to an embodiment of the present disclosure, the platooning control apparatus 100 may be implemented inside a vehicle. In this embodiment, the platooning control apparatus 100 may be formed integrally with the internal control units of the vehicle. In another embodiment, the platooning control apparatus 100 may be implemented separately from the internal control units of the vehicle to be connected with the internal control units of the vehicle through a separate connector.

The platooning control apparatus 100 determines whether the leading vehicle in the platooning line is expected to enter a restricted area during platooning. The determination may be based on information (for example, a road having a speed limit, a speed bump, an uphill road, or a crossroad) on the restricted area. When the LV is expected to enter the restricted area, the FVs may increase the distance between the FVs to prevent collision between the FVs due to the rapid deceleration of the LV. The LV may restrict acceleration until the FVs completely leave the restricted area based on the distance between the FVs after the LV leaves the restricted area. Accordingly, the platooning control apparatus 100 may prevent the platooning line from being broken up. The platooning line may be broken up because the distance between the vehicles in the platooning line becomes instantaneously longer than a preset distance when the vehicles in the platoon travel in the restricted area.

The platooning control apparatus 100 may include a communication part 110, a storage 120, a display 130, and a processor 140.

The communication part 110 is a hardware device implemented with various electronic circuits to transmit or receive a signal through wireless or wired connection. The communication part 110 may make V2V communication, which is inter-vehicle communication. The communication part 110 may further make V2X communication. The V2X communication is communication between a vehicle and an external server through an in-vehicle network communication technology, a wireless communication technology, or a short range communication technology. The communication may be with an external server of a vehicle, an infrastructure, and other vehicles. In this embodiment, the in-vehicle network communication technology may include a controller area network (CAN) communication technology, a local interconnect network (LIN) communication technology, or a FlexRay communication technology. The in-vehicle communication may be performed through the above communication technologies. The wireless communication technology may include a wireless LAN (WLAN), a wireless broadband (Wibro), a Wi-Fi, or a World Interoperability for Microwave Access (Wimax). The short range communication technology may include Bluetooth, ZigBee, ultra wideband (UWB), radio frequency identification (RFID), or infrared data association (IrDA).

In one embodiment, the communication part 110 may share the platooning information through the V2V communication between the vehicles under platooning. In this embodiment, the platooning information may include information on a platooning speed, an inter-vehicle distance, a destination, or a route.

In one embodiment, the communication part 110 may receive driving road information from an external server by making the V2X communication. In this embodiment, the driving road information may include information on a restricted area. In other words, the driving road information may include information on a speed limit of a road, information on a speed bump, information on an uphill road, and/or information on a crossroad.

The storage 120 may store the sensing result of the sensing device 200 and data and/or algorithms necessary for the processor 140 to operate.

In one embodiment, the storage 150 may store the platooning information, such as the distance between vehicles under platooning and vehicle speed information, which are received through the communication part 110 from the vehicles in the platooning line. In another embodiment, the storage 150 may store travelling road information received from an external server. In addition, the storage 150 may store information on an obstacle, such as a preceding vehicle, sensed by the sensing device 200.

The storage 120 may be implemented with at least one storage medium of a memory. The memory may be a flash memory type, a hard disk type, a micro type, a type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, and an optical disk-type memory.

Figure 2:
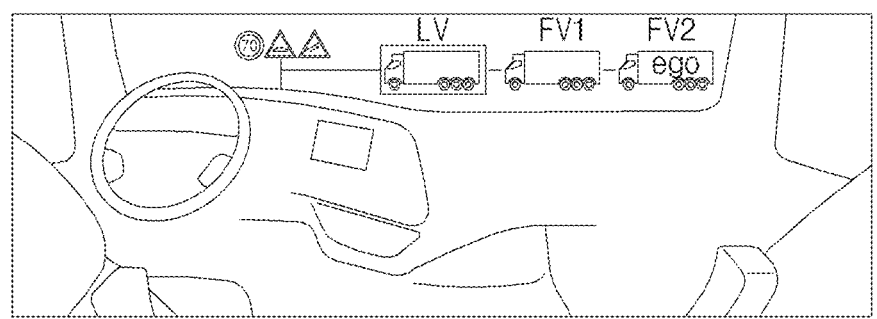
FIG. 2 is a view illustrating a screen for a restricted area displayed on a display of an FV in a platooning line according to an embodiment of the present disclosure.
Figure 3:
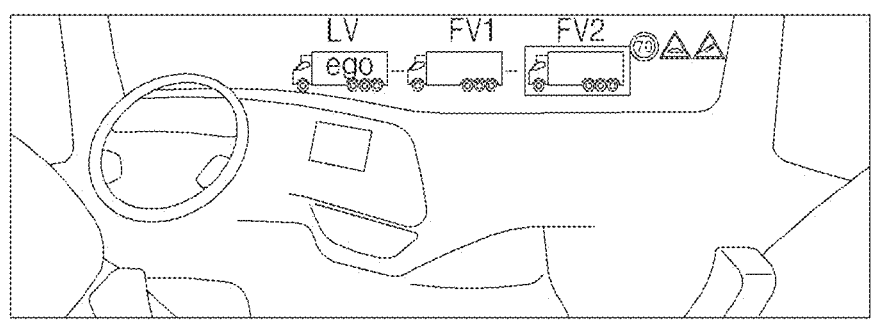
FIG. 3 is a view illustrating a screen for a restricted area displayed on a display of an LV in a platooning line according to an embodiment of the present disclosure.

The display 130 may include an input device to receive a control command from a user and an output device to output the operation state and the operation result of the platooning control apparatus 100. In this embodiment, the input device may include a key button and may further include a mouse, a joystick, a jog shuttle, a stylus pen, or the like. In addition, the input device may include a soft key implemented on a display. The output device may include a display and may further include a voice output device such as a speaker. When a touch sensor product, such as a touch film, a touch sheet, or a touch pad, is included in the display, the display may operate as a touch screen. Thus, the input device and the output device may be implemented in the integral form. According to the present disclosure, the output device may output information on a restricted area of a platoon as illustrated in FIGS. 2 and 3. FIG. 2 is a view illustrating a screen for a restricted area displayed on a display of the FV in a platooning line according to an embodiment of the present disclosure. FIG. 3 is a view illustrating a screen for a restricted area displayed on a display of the LV in a platooning line according to an embodiment of the present disclosure.

It may be recognized from FIG. 2 that the restricted area (having a speed limit or a speed bump) is present in front of the LV. It may be recognized from FIG. 3 that the restricted area is displayed behind the FV2, which is the last following vehicle, because the FV2 has passed through the restricted area.

In this embodiment, the display may include at least one of a liquid crystal display (LCD), a thin film transistor-liquid crystal display (TFT LCD), an organic light-emitting diode (OLED), a flexible display, a field emission display (FED), and/or a three dimensional display (3D display).

The processor 140 may be electrically connected with the communication part 110, the storage 120, the display 130, and the like. The processor 140 may electrically control each component and may be an electric circuit that executes software commands. Accordingly, the processor 140 may perform various data processing and calculation as described below.

The processor 140 may process signals transmitted between the components of the platooning control apparatus 100. The processor 140 may be, for example, an electronic control unit (ECU), a micro controller unit (MCU), or another lower-level controller mounted in the vehicle.

The processor 140 may determine whether the LV in the platooning line is expected to enter the restricted area based on the information on the restricted area under platooning. In other words, the processor 140 may determine whether the LV in the platooning line is expected to enter the restricted area based on information on a map received from an external server of the vehicles.

The processor 140 may increase the distance between the FVs to prevent a collision between the FVs due to the rapid deceleration of the LV. The processor 140 may restrict the LV from accelerating until the FVs completely leave the restricted area based on the distance between the FVs after the LVs leave the restricted area when the LV is expected to enter the restricted area. In this embodiment, the restricted area may include at least one of a road having a speed limit, a speed bump, an uphill road, and/or a crossroad.

The processor 140 may calculate a reference distance (PreviewDistance) using the speed (Vel_LV) of the LV and a preset margin time (Ts_pre).

$$\text{PreviewDistance [m]}=Ts\_pre(\text{preview Time})[s] \times Vel\_LV[m/s] \quad \text{Equation 1}$$

In other words, as in Equation 1, the processor 140 may calculate a reference distance (PreviewDistance) by multiplying the speed (Vel_LV) of the LV by a preset margin time (Ts_pre).

The processor 140 may determine whether a remaining distance until the LV reaches the restricted area is shorter than the reference distance. The processor 140 may increase the distance to a preceding vehicle to prevent collisions due to the rapid deceleration of the preceding vehicles. The increasing of the distance may be performed when the remaining distance until the LV reaches the restricted area is shorter than the reference distance and when a host vehicle is the FV. In this embodiment, as illustrated in FIG. 2, the processor 140 may perform a control operation such that the information on the restricted area of the LV is displayed on displays 130 of the FVs.

The processor 140 may control the speed of the platooning line such that the platooning line travels at a preset speed. The controlling of the speed is performed when the remaining distance until the LV reaches the restricted area is equal to or longer than the reference distance. In other words, the processor 140 may control the platooning line to travel as usual until the LV almost reaches the restricted area. The processor 140 may perform a control operation to increase the inter-vehicle distance when the LV almost reaches the restricted area, i.e. when the remaining distance until the LV reaches the restricted area is shorter than the reference distance.

The processor 140 may determine whether the last vehicle in the platooning line passes through the restricted area. The processor 140 may control the speed of the platooning line to the preset speed when the last vehicle in the platooning line passes through the restricted area.

The processor 140 may restrict the vehicles in the platooning line from accelerating and may display, on the display 130, information on the restricted area of the FVs as illustrated in FIG. 3 when the preset margin time does not elapse after the last vehicle in the platooning line passes through the restricted area.

The information on the restricted area of the FVs may be displayed on the display of the LV as illustrated in FIG. 3. The LV may perform speed control to be matched with the restricted condition without accelerating to the preset speed to maintain the platooning line. The speed control is performed when the FVs do not pass through the restricted area even though the LV leaves the restricted area. In addition, the FVs may increase the distance therebetween to prevent collisions with the preceding vehicles.

In addition, the LV may start to accelerate to the preset speed when the preset margin time has elapsed after even the last vehicle in the platooning line passes through the restricted area.

Figure 4:
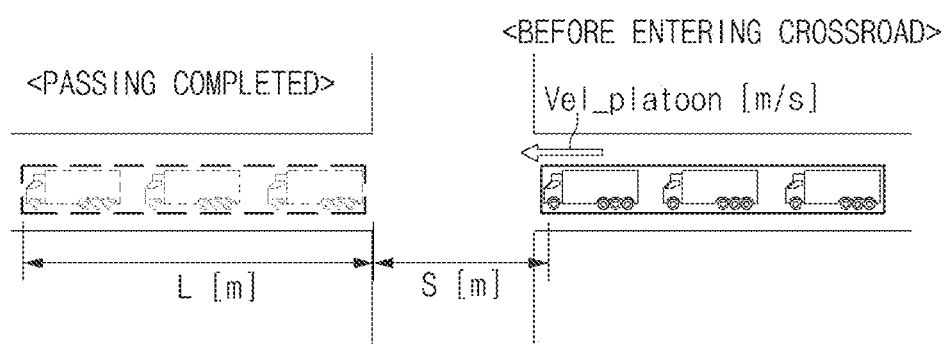
FIG. 4 is a view illustrating a screen for controlling platooning when a platooning line enters a crossroad according to an embodiment of the present disclosure.

When the LV is expected to enter a crossroad, the processor 140 may calculate a passable time to pass through the cross road based on the whole length 'L' of the platooning line, the width 'S' of the crossroad, and the speed 'Vel_platoon' of the platooning line as illustrated in FIG. 4. FIG. 4 is a view illustrating a screen for controlling platooning when the platooning line enters the crossroad according to an embodiment of the present disclosure.

$$\text{Passable time [sec.]}=(S+L)/Vel\_platoon \quad \text{Equation 2}$$

In other words, the passable time refers to a time that all vehicles in the platooning line are able to pass through the crossroad. In this embodiment, the processor 140 may receive a remaining time (T_remain) of the green light of the crossroad through the V2X communication with surrounding traffic lights when entering the crossroad.

The processor 140 determines whether the time remaining until the traffic light on the crossroad is changed exceeds the passable time. When the time remaining until the traffic light on the crossroad is changed exceeds the passable time and when travelling is currently performed at a setting speed, the processor 140 may control the platooning line to travel at a preset speed. This is because all vehicles in the platooning line may pass through the crossroad.

The processor 140 may control the vehicles in the platooning line to stop before entering the crossroad when the time remaining until the traffic light on the crossroad is changed is equal to or smaller than the passable time. This is because it is difficult for all vehicles in the platooning line to pass through the crossroad.

The processor 140 may increase the inter-vehicle distance to the preceding vehicle to prevent collision with the preceding vehicle. The increasing of the inter-vehicle distance is performed when the remaining time until the traffic light on the crossroad is changed is equal to or smaller than the passable time and when the host vehicle is the FV.

The sensing device 200 may include at least one sensor to detect an obstacle, such as a preceding vehicle, positioned around the host vehicle and to measure a distance to the obstacle and/or a speed relative to the obstacle. The sensing device 200 may include a plurality of sensors to detect an external object of the vehicle. The plurality of sensors may obtain information on the position of the external object, the speed of the external object, a moving direction of the external object, and/or a type of the external object (e.g., a vehicle, a pedestrian, a bicycle or a motorcycle). To this end, the sensing device 200 may include a camera, a radar, an ultrasonic sensor, a laser scanner and/or a corner radar, a LiDAR, an acceleration sensor, a yaw rate sensor, a torque measurement sensor and/or a wheel speed sensor, and a steering angle sensor.

The steering control device 400 may be to control the steering angle of the vehicle. The steering control device 400 may include a steering wheel, an actuator operating together with the steering wheel, and a controller to control the actuator.

The braking control device 500 may be to control the braking of the vehicle. The braking control device 500 may include a controller to control a brake.

The engine control device 600 may be to control the engine driving of the vehicle. The engine control device 600 may include a controller to control the speed of the vehicle.

Figure 5:
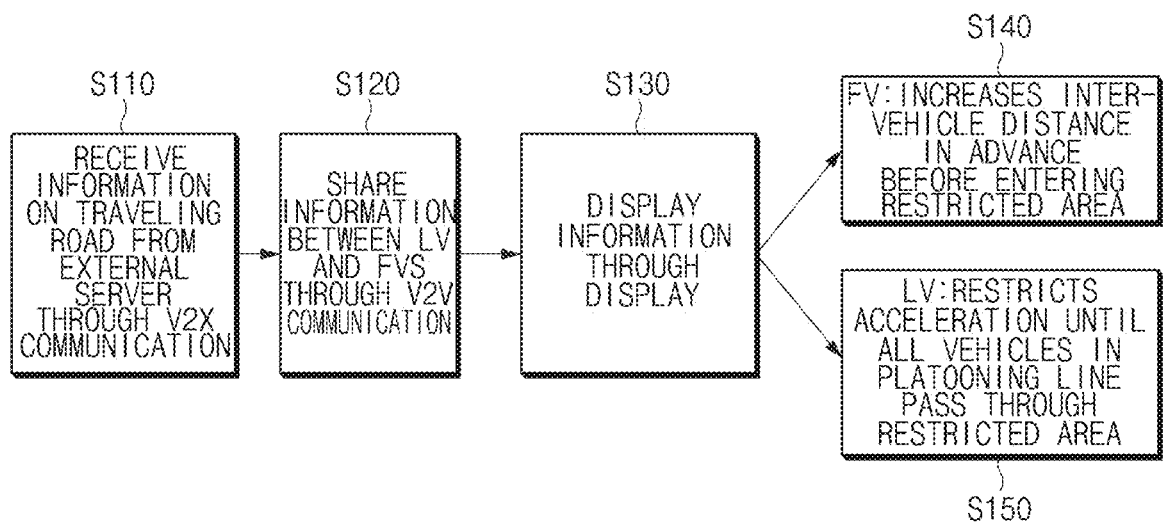
FIG. 5 is a flowchart illustrating a method for controlling platooning according to an embodiment of the present disclosure.
Figure 6:
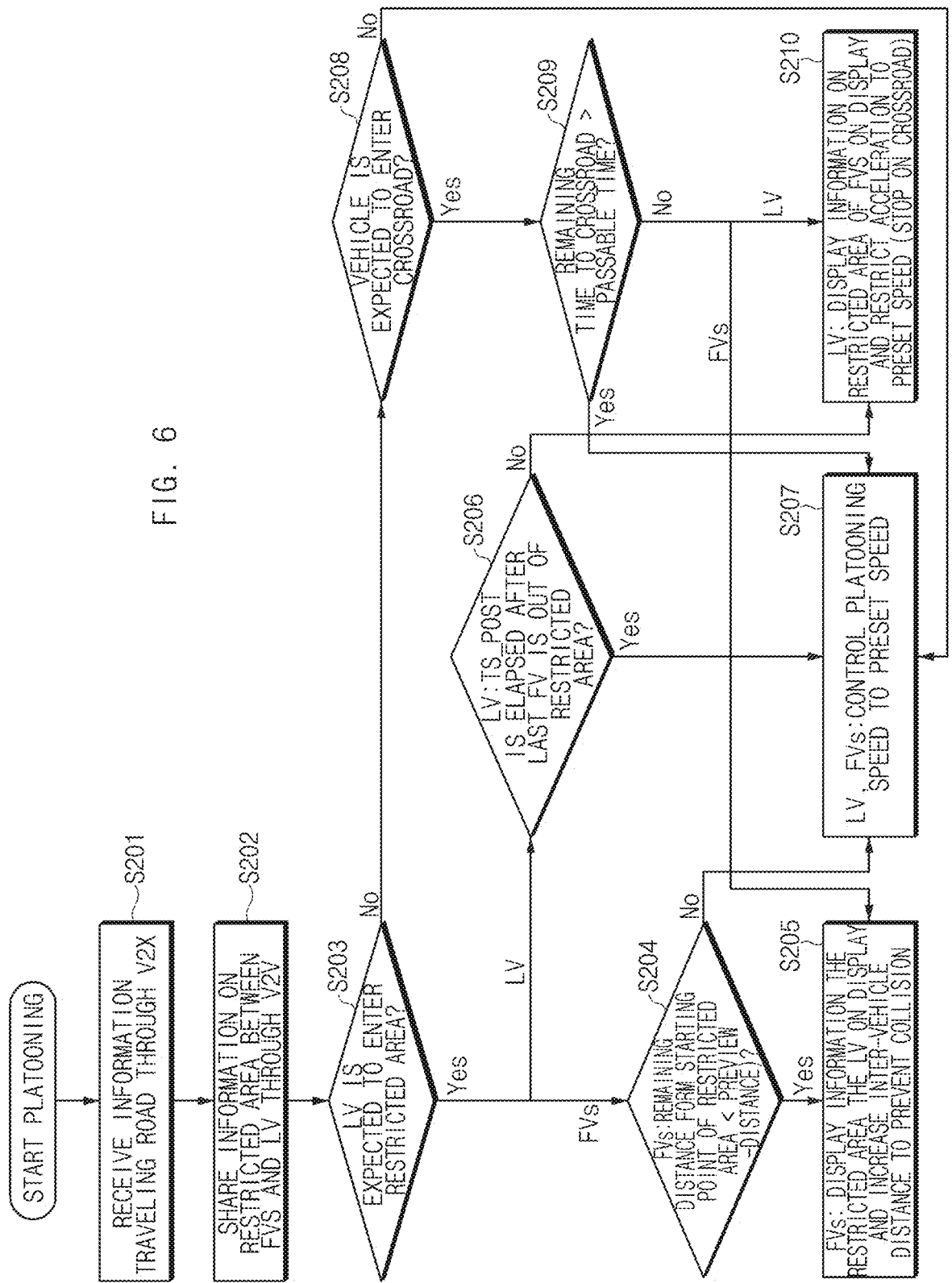
FIG. 6 is a flowchart illustrating the details of the method for controlling the platooning in FIG. 5.

Hereinafter, a method for controlling platooning is described in detail with reference to FIGS. 5 and 6. FIG. 5 is a flowchart illustrating the method for controlling the platooning according to an embodiment of the present disclosure. FIG. 6 is a flowchart illustrating the details of the method for controlling the platooning in FIG. 5.

The following description is made on the assumption that the platooning control apparatus 100 of FIG. 1 performs processes of FIGS. 5 and 6. In addition, in the following description made with reference to FIG. 5, it may be understood that operations described as being performed by an apparatus are controlled by the processor 140 of the platooning control apparatus 100.

Referring to FIG. 5, the platooning control apparatus 100 mounted in each vehicle in the platooning line may receive information (information on the restricted area) on a travelling road from the external server through the V2X communication (S110). The information on the travelling road may include information on a specific restricted area, such as a road having a speed limit, a speed bump, an uphill road, or a crossroad.

The platooning control apparatuses 100 mounted in the vehicles in the platooning line may share platooning information and the information on the restricted area of each vehicle (S120).

The platooning control apparatus 100 mounted in each vehicle in the platooning line may display, on the display of the vehicle, information on the restricted area based on information on the travelling road (S130).

Accordingly, the platooning control apparatuses 100 of the FVs may increase the inter-vehicle distance to the preceding vehicle (vehicles driving in front of FVs) in advance before entering the restricted area (S140).

The platooning control apparatus 100 of the LV may restrict acceleration until all vehicles in the platooning line pass through the restricted area (S150).

Referring to FIG. 6, the platooning control apparatus 100 mounted in each vehicle in the platooning line may receive information (information on the restricted area) on a travelling road from the external server through the V2X communication (S201).

The platooning control apparatus 100 mounted in each vehicle in the platooning line may share platooning information and the information on the restricted area of each vehicle (S202).

The platooning control apparatus 100 mounted in each vehicle in the platooning line determines whether the LV in the platooning line is expected to enter a restricted area having a speed limit (S203). In other words, each platooning control apparatus 100 may determine whether the LV is expected to enter the restricted area on a platooning route based on information on a map received from an external server through V2X communication.

The following description is made regarding the control methods of the LV and the FVs while distinguishing between the LV and the FVs, when the LV is expected to enter the restricted area.

First, the FVs determine whether the remaining distance until the LV reaches a starting point of the restricted area from a preset position is shorter than the reference distance (previewDistance) (S204). In this embodiment, the FVs may calculate the reference distance (previewDistance) by multiplying the speed (Vel_LV) of the LV by a preset margin time (Ts_pre). In this embodiment, the margin time (Ts_pre) may be previously set based on an experimental value and stored. The speed (Vel_LV) of the LV may be received from the LV. Although FIG. 6 illustrates that the FVs determine whether the remaining distance to the starting point of the restricted area is shorter than the reference distance (previewDistance), the FVs may receive the determination result from the LV without determining the result.

When the remaining distance to the starting point of the restricted area is shorter than the reference distance, the FVs may display the information on the restricted area of the LV on the display. The FVs may increase the inter-vehicle distance to prevent the collision with the preceding vehicle (S205).

The platooning control apparatuses 100 of the FVs may control a platooning speed to a preset speed (S207). This is because there is a spare time until the LV reaches the starting point of the restricted area when the remaining distance to the starting point of the restricted area is equal to or greater than the reference distance (previewDistance) in step S204.

Meanwhile, when the subsequent step of S203 is performed, in other words, the LV is expected to enter the restricted area, the platooning control apparatus 100 of the LV may determine whether a preset margin time (Ts_post) has elapsed after the last FV in the platooning line leaves the restricted area (S206).

When the preset margin time (Ts_post) has elapsed after the last FV in the platooning line leaves the restricted area (S206), the platooning control apparatuses 100 of the FVs may control the platooning speed to the preset speed (S207).

In other words, the inter-vehicle distance may be increased when the acceleration is instantly performed even though all vehicles in the platooning line leave the restricted area. Accordingly, the vehicles are controlled not to accelerate until a specific margin time has elapsed instead of accelerating instantly as soon as the vehicles leave the restricted area. Thus, the safety is enhanced.

Meanwhile, when the preset margin time has not elapsed after the last vehicle in the platooning line leaves the restricted area, it is determined that the safe phase does not come. Accordingly, the platooning control apparatus 100 of the LV may display the information on the restricted area on the display and may restrict the acceleration to the preset speed (S210).

The platooning control apparatuses 100 of the LV and the FVs may determine whether the LV is expected to enter the crossroad (S208) when the LV is not expected to enter the restricted area in step S203.

In other words, the platooning control apparatuses 100 of the LV and the FVs may determine whether the LV is expected to enter the crossroad based on information on a road received from an external server through V2X communication.

When the LV is expected to enter the crossroad, the platooning control apparatuses 100 of the LV and the FVs determine whether the remaining time on the crossroad, i.e., the remaining time until the traffic light on the crossroad is changed exceeds the calculated passable time.

In this embodiment, the platooning control apparatuses 100 of the LV and the FVs may calculate the passable time using a result value obtained by adding the whole length 'L' of the platooning line and the width 'S' of the crossroad and dividing the adding result value by the speed 'Vel_platoon' of the platooning line.

When the remaining time of the traffic light of the crossroad exceeds the calculated passable time, all vehicles in the platooning line are able to pass through the crossroad without being blocked by the traffic light. Accordingly, the platooning control apparatuses 100 of the FVs may control the platooning speed at the preset speed (S207).

Meanwhile, the following description is made regarding when the remaining time of the traffic light of the crossroad does not exceed the calculated passable time by distinguishing between the FVs and the LV.

In other words, when the remaining time of the traffic light of the crossroad does not exceed the calculated passable time, the platooning control apparatuses 100 of the FVs may display, on the display, the restricted area of the LV and may increase the inter-vehicle distance. Thus, the collision with the preceding vehicle (S205) may be prevented. Meanwhile, when the remaining time of the traffic light of the crossroad does not exceed the calculated passable time, it is difficult for all vehicles in the platooning line to pass through the crossroad within the remaining time of the traffic light. Thus, the platooning control apparatus 100 of the LV may display the information on the restricted area on the display and may control all vehicles in the platooning line to stop before passing through the crossroad (S210). In other words, the platooning control apparatus 100 of the LV may stop the LV and may transmit a stop command to the FVs.

As described above, according to the present disclosure, the vehicles in the platooning line may share the information on the platooning and the information on the restricted area. Thus, the FVs increase the inter-vehicle distance in advance before entering the restricted area to prevent the collision due to the rapid deceleration of the LV. In addition, the LV restricts the acceleration until all vehicles in the platooning line pass through the restricted area to maintain the platooning line. Thus, the fuel efficiency may be improved.

Figure 7:
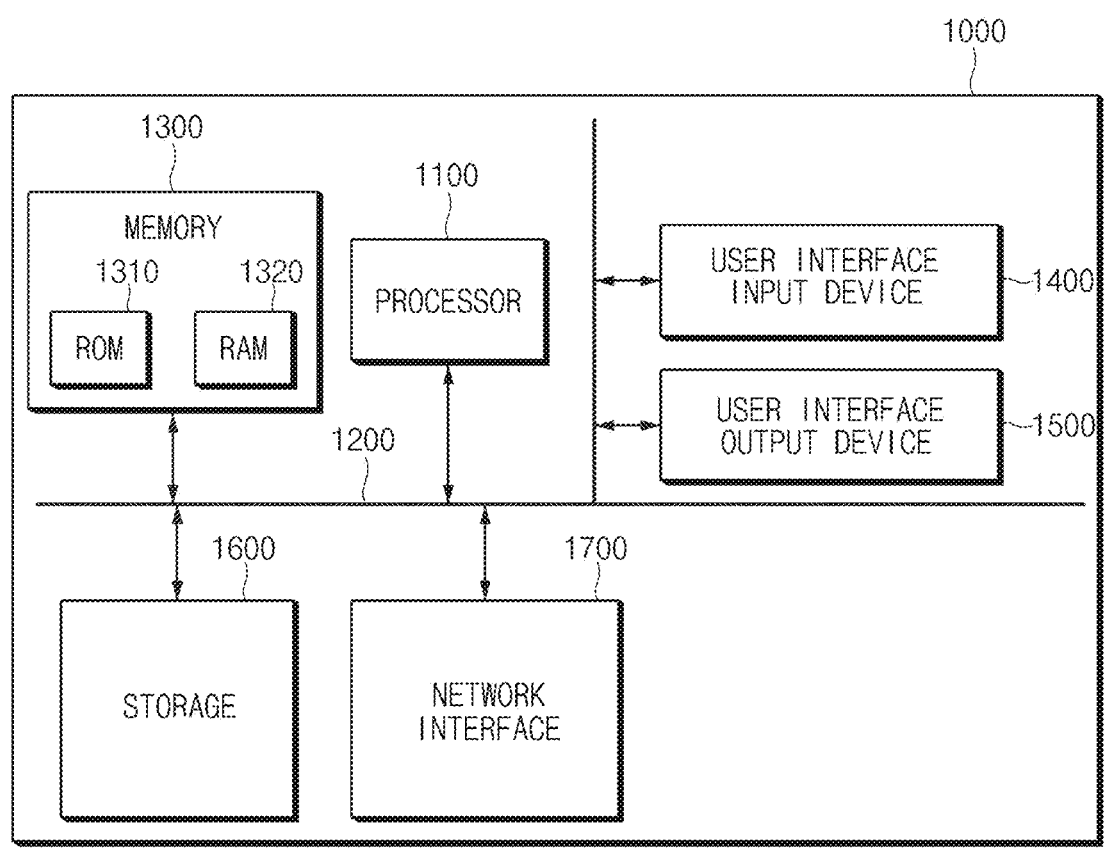
FIG. 7 illustrates a computing system according to an embodiment of the present disclosure.

FIG. 7 illustrates a computing system according to an embodiment of the present disclosure.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random-access memory (RAM).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. In another embodiment, the storage medium may be integrated with the processor 1100. The processor 1100 and the storage medium may reside in an application specific integrated circuit (ASIC). The ASIC may reside in a user terminal. In another embodiment, the processor 1100 and the storage medium may reside as separate components of the user terminal.

As described above, according to the present disclosure, the platooning may be controlled such that vehicles in a platooning line share information on a restricted area together based on V2X and V2V communications to maintain a platooning line when passing through the restricted area. The present disclosure further provides a method for controlling the platooning.

In addition, a variety of effects directly or indirectly understood through the disclosure may be provided.

Hereinabove, although the present disclosure has been described with reference to specific embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims. All equivalents thereof should be construed as being included within the scope of the present disclosure.

What is claimed is:

1. An apparatus for controlling platooning, the apparatus comprising:
   a communication part configured to transmit or receive information on the platooning and information on a restricted area from or to vehicles in a platooning line and a vehicle external server; and
   a processor configured to restrict an inter-vehicle distance from being increased or an acceleration when a leading vehicle in the platooning line enters the restricted area based on the information on the restricted area,
   wherein the processor is configured to calculate a reference distance using a speed of the leading vehicle and a preset margin time.

2. The apparatus of claim 1, further comprising:
   a display controlled by the processor to display the information on the platooning and the information on the restricted area.

3. The apparatus of claim 2, wherein the processor is further configured to:
   determine whether a remaining distance until the leading vehicle reaches the restricted area is shorter than the reference distance.

4. The apparatus of claim 3, wherein the processor is configured to:
   increase the inter-vehicle distance to a preceding vehicle when the remaining distance until the leading vehicle reaches the restricted area is shorter than the reference distance and when a host vehicle is a following vehicle.

5. The apparatus of claim 4, wherein the processor is configured to:
   perform a control operation to display the information on the restricted area of the leading vehicle on the display.

6. The apparatus of claim 3, wherein the processor is configured to:
   control a speed of the platooning line to a preset speed when the remaining distance until the leading vehicle reaches the restricted area is equal to or longer than the reference distance.

7. The apparatus of claim 1, wherein the processor is configured to:
   determine whether the leading vehicle is expected to enter the restricted area based on information on a map received from the vehicle external server.

8. The apparatus of claim 2, wherein the processor is configured to:

determine whether a last vehicle in the platooning line passes through the restricted area.

9. The apparatus of claim 8, wherein the processor is configured to:
control a speed of the platooning line to a preset speed when the last vehicle in the platooning line passes through the restricted area.

10. The apparatus of claim 8, wherein the processor is configured to:
restrict the vehicles in the platooning line from accelerating when a preset margin time has not elapsed after the last vehicle in the platooning line passes through the restricted area.

11. The apparatus of claim 8, wherein the processor is configured to:
perform a control operation to display the information on the restricted area of following vehicles on the display of the leading vehicle.

12. The apparatus of claim 1, wherein the restricted area includes:
at least one of a road having a speed limit, a speed bump, an uphill road, or a crossroad.

13. The apparatus of claim 1, wherein the processor is configured to:
calculate a passable time based on a whole length of the platooning line, a width of a crossroad, and a speed of the platooning line when the leading vehicle is expected to enter the crossroad.

14. The apparatus of claim 13, wherein the processor is configured to:
determine whether a time remaining until a traffic light on the crossroad is changed exceeds the passable time.

15. The apparatus of claim 14, wherein the processor is configured to:
control the platooning line to travel at a preset speed when the time remaining until the traffic light on the crossroad is changed exceeds the passable time.

16. The apparatus of claim 14, wherein the processor is configured to:
control the vehicles in the platooning line to stop before entering the crossroad when the time remaining until the traffic light on the crossroad is changed is equal to or smaller than the passable time.

17. The apparatus of claim 14, wherein the processor is configured to:
increase the inter-vehicle distance to a preceding vehicle when the remaining time until the traffic light on the crossroad is changed is equal to or smaller than the passable time and when a host vehicle is a following vehicle.

18. An apparatus for controlling platooning, the apparatus comprising:
a processor to restrict an inter-vehicle distance between vehicles in a platooning line from being increased or an acceleration of the vehicles when a leading vehicle in the platooning line enters a restricted area; and
a display to display information of an entrance to the restricted area,
wherein the processor is configured to calculate a reference distance using a speed of the leading vehicle and a preset margin time.

19. A method for controlling platooning, the method comprising:
transmitting or receiving information on the platooning and information on a restricted area from or to vehicles in a platooning line and a vehicle external server; and
restricting an inter-vehicle distance between the vehicles in the platooning line from being increased or an acceleration of the vehicles when a leading vehicle in the platooning line enters the restricted area,
wherein the restricting of the inter-vehicle distance between the vehicles in the platooning line from being increased or the acceleration of the vehicles includes calculating a reference distance using a speed of the leading vehicle and a preset margin time.

20. The method of claim 19, wherein the restricting of the inter-vehicle distance between the vehicles in the platooning line from being increased or the acceleration of the vehicles further includes:
determining whether a remaining distance until the leading vehicle reaches the restricted area is shorter than the reference distance;
increasing the inter-vehicle distance to a preceding vehicle when the remaining distance until the leading vehicle reaches the restricted area is shorter than the reference distance and when a host vehicle is a following vehicle; and
controlling a speed of the platooning line to a preset speed when the remaining distance until the leading vehicle reaches the restricted area is equal to or longer than the reference distance.

* * * * *